J. P. ERHART.
DIRIGIBLE LIGHT FOR AUTOMOBILES.
APPLICATION FILED MAR. 10, 1919.
1,324,652.
Patented Dec. 9, 1919.
2 SHEETS—SHEET 2.
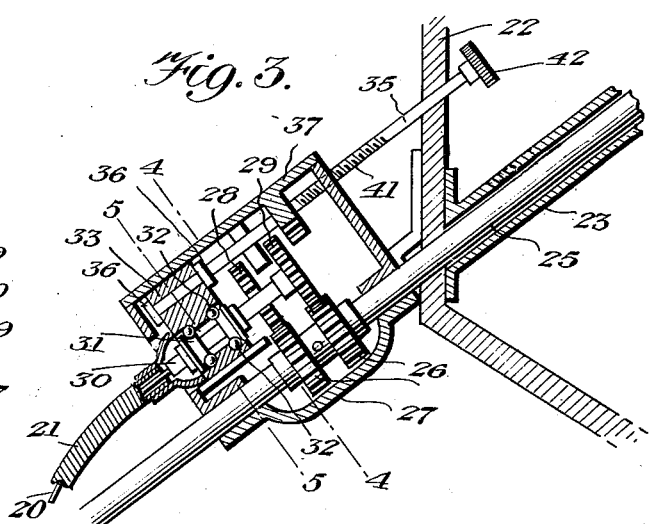
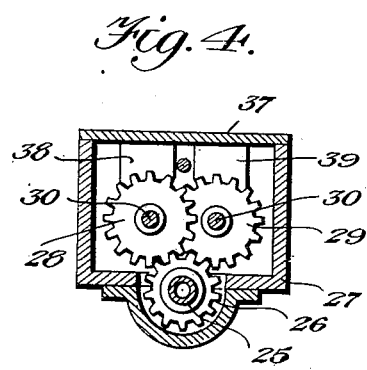
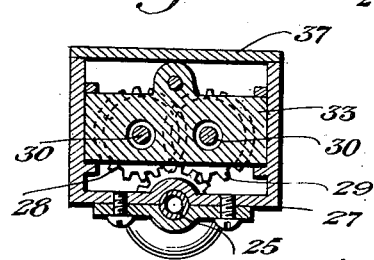
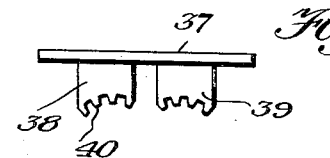
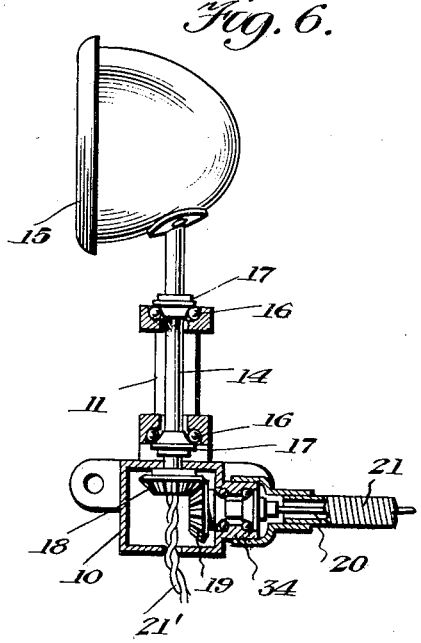
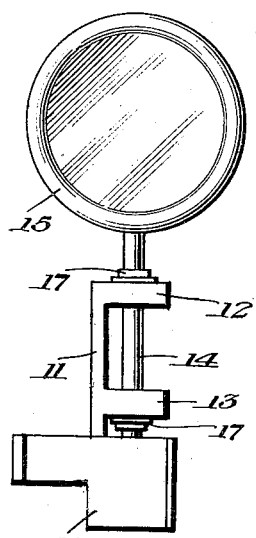
Inventor
Julius P. Erhart
By Victor J. Evans
Attorney

UNITED STATES PATENT OFFICE.

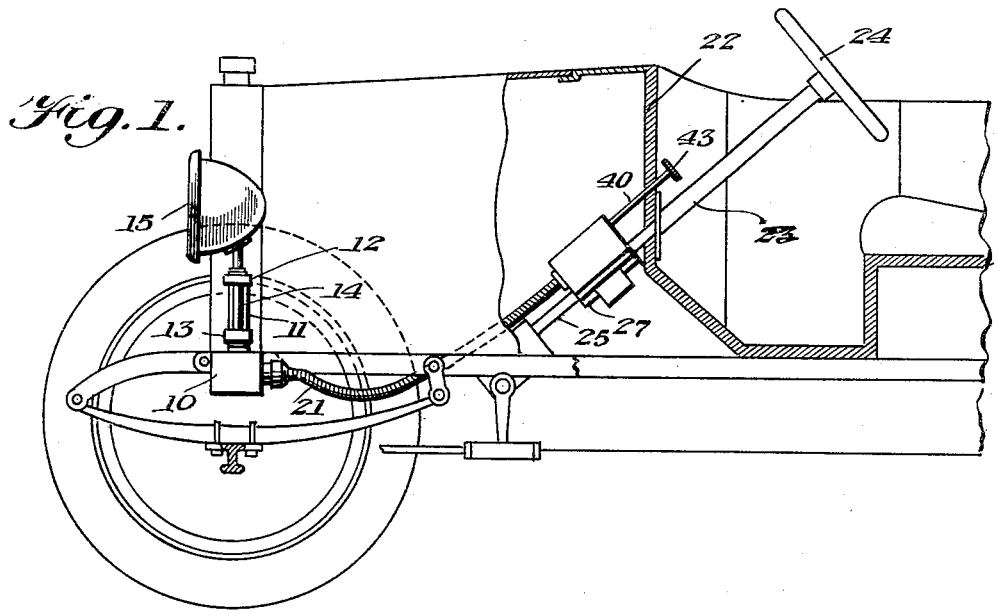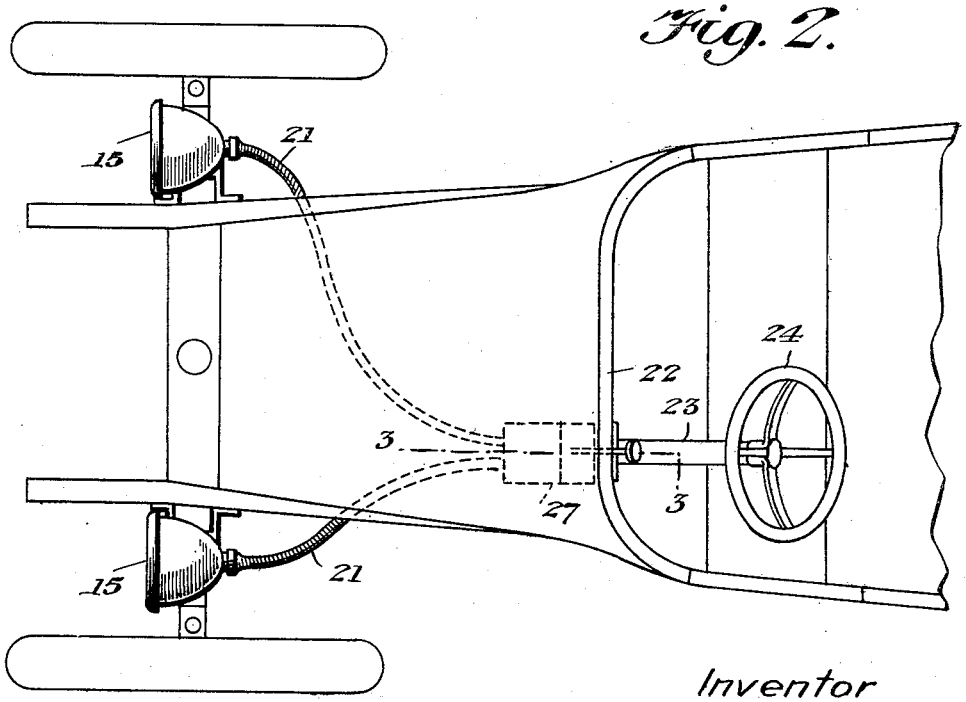

JULIUS P. ERHART, OF QUANTICO, VIRGINIA.

DIRIGIBLE LIGHT FOR AUTOMOBILES.

1,324,652. Specification of Letters Patent. Patented Dec. 9, 1919.

Application filed March 10, 1919. Serial No. 281,584.

*To all whom it may concern:*

Be it known that I, JULIUS P. ERHART, a citizen of the United States, residing at Quantico, in the county of Prince William and State of Virginia, have invented new and useful Improvements in Dirigible Lights for Automobiles, of which the following is a specification.

This invention has reference to dirigible lights for automobiles.

An object of the invention is to provide means operable from the instrument board of an automobile for turning the headlights of the machine so that the rays of light therefrom will be directed in a straight path forward of the course of travel of the machine.

A further object of the invention is to produce dirigible headlights and operating means therefor which shall comprise a comparatively simple construction, readily applicable to any ordinary construction of automobiles, easily actuated and positive in such action.

Other objects and advantages will present themselves as the nature of the invention is better understood, reference being had to the accompanying drawings, in which:

Figure 1 is a side elevation, parts being broken away and parts being in section of an automobile provided with the improvement.

Fig. 2 is a top plan view thereof.

Fig. 3 is a greatly enlarged sectional view approximately on the line 3—3 of Fig. 2.

Fig. 4 is a sectional view approximately on the line 4—4 of Fig. 3.

Fig. 5 is a sectional view approximately on the line 5—5 of Fig. 3.

Fig. 6 is a side elevation, parts being in section, of one of the headlights.

Fig. 7 is a front elevation thereof.

Fig. 8 is a detail perspective view of the cam member employed.

Either on the front mud guards or to the sides of an automobile, at the front thereof, I secure hollow brackets 10. These brackets are provided with upstanding standards 11 having spaced offset portions 12 and 13 respectively, and through these offset portions is journaled a staff or standard 14 for the headlights 15. The staff or standard 14 is round in cross section and each of the offset members 12 and 13 has a depression therein providing a race-way for anti-frictional elements 16, the cap members 17 which contact with the said anti-frictional elements or balls 16 being secured on the staff or standard 14. The bracket members 10 include each a hollow portion within which the staff or standard 14 extends, the said staff or standard having its lower end provided with a spur gear 18 which is in mesh with a similar gear 19 secured upon a flexible shaft 20 that is inclosed in a suitable flexible casing 21. The wires 21' leading from a suitable source of electric supply, and connected with the bulbs in the headlights 15 pass through a central opening in the gears 18 and through the hollow staffs or standards 14 as disclosed in Fig. 6 of the drawings.

The dash or instrument board of the machine is indicated by the numeral 22, the steering post casing, which is secured to the member 22 is indicated by the numeral 23, the steering wheel by the numeral 24 and the steering rod by the numeral 25. The steering rod 25, outward of the front board 22 has secured thereon two spaced toothed wheels or gears 26. This portion of the steering rod is inclosed in a suitable casing 27, which, of course, also incloses the gears 26. The gears 26 are designed to be engaged by gear wheels 28 and 29 that are secured on the ends of flexible shafts 20. For distinction the ends of these shafts are indicated by the numerals 30 and the same, inward of the gears 26 have hub portions in the nature of cones 31 that provide ways for anti-frictional balls 32. These portions of the shafts are arranged in a guide block 33, the anti-frictional elements 32 being received in ways in the said guide block. In this connection it should be stated that suitable anti-frictional elements are arranged between the shaft and the sleeve 34 on the hollow brackets 10 to insure the free rotation of the shafts.

The block 33 has a longitudinal opening therethrough in which is received one end of an operating rod 35. The rod 35 is provided with heads or flanges 36 that contact with the opposite sides of the block so that the rod is held against longitudinal movement through the blocks, but, being round in cross section, is freely revoluble therein.

The casing 27 is closed by a removable plate 37 that is secured to the casing in any desired or preferred manner, and on the inner face of the closure plate are two oppositely disposed longitudinal spaced plates 38 and 39, the inner ends of which are concaved and provided with spaced teeth 40. The rod 35 is provided with a threaded portion 41 that engages in a threaded orifice in the inner end of the casing 27, or the end thereof next to the front board 22. The rod 35 is of a length to be passed through a suitable opening in the front board and has its inner end provided with a knurled head 42. It will be apparent that by turning the operating rod in one direction the block 33 will be moved longitudinally through the casing, also moving the ends of the shafts provided with the gears 28 and 29, bringing the said gears into mesh with the respective gear wheels 26 on the steering rod, and consequently the turning of the steering rod will cause the shafts 20 to likewise turn, and through the mechanism above described turn the head lights 15 so that the said head lights will be arranged to cast their illuminations in a straight ahead direction with respect to the path of travel of the automobile. By operating the rod in another direction the block 33 and the gears 28 and 29 on the shafts 20 will be moved longitudinally through the casing, but the said gears 28 and 29 will be brought into meshing engagement with the toothed plates 38 and 39.

It is believed, from the foregoing description, when taken in connection with the drawings, the simplicity of the construction and the advantages thereof will be readily apparent without further detailed description.

Having thus described the invention, what is claimed as new, is:—

1. Dirigible headlights, flexible shafts connected thereto, toothed wheels on the free ends of said shafts, a block on the shafts inward of the toothed wheels, a revoluble member, toothed gears thereon, an operating rod designed when actuated to slide the block and bring the toothed wheels thereon in mesh with the toothed wheels of the revoluble member or for bringing said toothed wheels out of mesh with the toothed wheels on the revoluble member.

2. Dirigible headlights, flexible shafts therefor, a longitudinally movable block in which the outer ends of said shafts are journaled, toothed wheels on the outer ends of said shafts outward of the block, a revoluble member, spaced toothed wheels thereon, means for sliding the block longitudinally to bring the toothed wheels thereon into or out of mesh with the toothed wheels on the revoluble member, and means for locking the toothed wheels of the shafts when in their last mentioned position whereby to hold the headlights against movement.

3. Dirigible headlights, standards supporting the same, brackets receiving said standards, anti-frictional means between the standards and brackets, means including flexible shafts coöperating with the standards for revolving the latter to turn the headlights, toothed wheels on said shafts, a revoluble member, spaced toothed wheels thereon, a casing inclosing the toothed wheels of the revoluble member and the toothed wheels of the shafts, a slidable block in the casing through which the flexible shafts pass, anti-frictional means between said shafts and said block, depending toothed plates in the casing disposed opposite the wheels on the respective flexible shafts, a longitudinally movable operating rod for the block whereby to bring the toothed wheels of the flexible shaft into engagement with the toothed wheels of the revoluble elements or to bring said toothed wheels out of such engagement and into engagement with the toothed places in the casing, and means for limiting the longitudinal movement of said rod.

In testimony whereof I affix my signature.

JULIUS P. ERHART.